(12) United States Patent
Neiske

(10) Patent No.: US 9,714,732 B2
(45) Date of Patent: Jul. 25, 2017

(54) CONNECTING DEVICE FOR CONDUITS OR HOSE LINES HAVING ASSEMBLY DETECTION

(75) Inventor: Oliver Neiske, Verl (DE)

(73) Assignee: PARKER HANNIFIN MANUFACTURING GERMANY GMBH & CO. KG, Bielefeld (DE)

( * ) Notice: Subject to any disclaimer, the term of this patent is extended or adjusted under 35 U.S.C. 154(b) by 993 days.

(21) Appl. No.: 13/983,091

(22) PCT Filed: Jan. 25, 2012

(86) PCT No.: PCT/EP2012/051104
§ 371 (c)(1),
(2), (4) Date: Oct. 15, 2013

(87) PCT Pub. No.: WO2012/104179
PCT Pub. Date: Aug. 9, 2012

(65) Prior Publication Data
US 2014/0028013 A1    Jan. 30, 2014

(30) Foreign Application Priority Data
Feb. 1, 2011    (DE) .......................... 10 2011 009 956

(51) Int. Cl.
*F16L 33/22*    (2006.01)
*F02N 15/06*    (2006.01)
(Continued)

(52) U.S. Cl.
CPC ............. *F16L 33/22* (2013.01); *F02N 15/067* (2013.01); *H01H 50/305* (2013.01); *H01H 51/065* (2013.01)

(58) Field of Classification Search
CPC ....... F16L 33/22; F16L 21/08; F16L 2201/10; F16L 2201/60; F16L 19/12; F16L 19/06; F16L 37/0845
(Continued)

(56) References Cited

U.S. PATENT DOCUMENTS 2,245,847 A * 6/1941 Bagby .................. F16L 37/107
285/361
2,393,252 A * 1/1946 Kaysing .................. F16L 19/06
277/622
(Continued)

FOREIGN PATENT DOCUMENTS

EP    0535867    4/1993
EP    0945662    9/1999
(Continued)

OTHER PUBLICATIONS

International Search Report for corresponding patent application No. PCT/EP2012/051104 dated Aug. 9, 2012.

*Primary Examiner* — Beth Stephan
(74) *Attorney, Agent, or Firm* — Renner, Otto, Boisselle & Sklar, LLP

(57) ABSTRACT

A connecting device for conduits or hose lines comprising a connecting body which has a borehole for conducting a medium flowing through the conduit or hose line therethrough, and a pipe-like end piece which can be inserted into a receptacle that is formed at the front end of the connecting body and which can fixed in said receptacle by means of a union nut that is arranged rotatably between a loosened position and an assembly position on the outside of the connecting body, wherein a display rendering the assembly state of the connecting device is arranged between the mutually facing end faces of the union nut and connecting body, is characterized in that the display consists of two annular display bodys (13, 14) as carriers of at least one (Continued)

marking in each case, each display body being formed at the end faces of the connecting body (10) and union nut (12), whereby at the start of assembly of the union nut (12) the markings of the two displays bodys (13, 14) are located at different locations on the circumference of the connecting body (10) and union nut (12) and when the assembly of the connecting device is completed, they are moved into a mutually agreeing position by the relative rotation of the two display bodys (13, 14) relative to each other that takes place when the union nut (12) is screwed on.

5 Claims, 3 Drawing Sheets

(51) Int. Cl.
    *H01H 50/30*     (2006.01)
    *H01H 51/06*     (2006.01)

(58) Field of Classification Search
    USPC .......................................................... 285/83
    See application file for complete search history.

(56) References Cited

U.S. PATENT DOCUMENTS

| | | | | |
|---|---|---|---|---|
| 2,489,919 A * | 11/1949 | Merriman | ............... | F16B 39/32 220/288 |
| 3,379,461 A * | 4/1968 | Davis | ...................... | F16L 19/06 285/341 |
| 4,637,636 A * | 1/1987 | Guest | ................. | F16L 37/0925 285/179 |
| 4,733,438 A * | 3/1988 | Stupakis | ................. | F16L 33/22 24/19 |
| 6,050,609 A * | 4/2000 | Boscaljon | ............. | F16L 19/005 285/354 |
| 6,056,326 A * | 5/2000 | Guest | ...................... | F16L 21/04 285/314 |
| 2006/0191102 A1* | 8/2006 | Hayes | ....................... | C23C 8/02 16/108 |
| 2008/0272590 A1* | 11/2008 | Howard | .................. | B25B 13/08 285/247 |
| 2009/0078322 A1* | 3/2009 | Thomas | ................. | F16L 19/025 137/15.09 |
| 2013/0015656 A1* | 1/2013 | Ehrke | .................... | F16L 37/113 285/316 |
| 2013/0161941 A1* | 6/2013 | Zulauf | ..................... | F16L 21/08 285/80 |

FOREIGN PATENT DOCUMENTS

| | | | | |
|---|---|---|---|---|
| EP | 1433992 | | 6/2004 | |
| EP | 102007032027 | | 2/2009 | |
| GB | 2167147 A | * | 5/1986 | .......... F16L 37/0925 |
| JP | S6465384 A | | 3/1989 | |
| JP | H06-201081 A | | 7/1994 | |
| JP | H06-89866 B | | 11/1994 | |
| JP | 2961532 B | | 10/1999 | |
| JP | H11-311385 A | | 11/1999 | |
| JP | 2003-254485 A | | 9/2003 | |
| JP | 2010-223347 A | | 10/2010 | |
| JP | 2010-265916 A | | 11/2010 | |
| WO | 99/57476 | | 11/1999 | |
| WO | 0142700 | | 6/2001 | |

\* cited by examiner

1

CONNECTING DEVICE FOR CONDUITS OR HOSE LINES HAVING ASSEMBLY DETECTION

The invention relates to a connecting device for pipes or hoses with a connecting body having a borehole for the passage of a medium flowing through the pipe or hose, and with a tubular end piece that can be inserted into a receptacle provided at the front end of the connecting body and fixable therein between a loosened position and an assembly position by means of a union nut arranged rotatably on the outside of the connecting body, whereby between the opposing end faces of union nut and connecting body a marker is arranged showing the state of assembly of the connecting device.

BACKGROUND

A connecting device with the aforementioned features is described in EP 0 366 789 B1. On both sides the end areas of pipes to be connected to each other are pushed into corresponding receptacles of a connecting body. These end areas of the pipes are each provided with a radial tube bulge on each of which a union nut is supported to fasten the assigned pipe end on the connecting body. The union nuts can be screwed onto corresponding external threads provided on the connecting body so that when assembling the connecting device the pipe ends are pressed into and held fast in the receptacles provided on the connecting body. If in terms of the correct or stipulated assembly of the connecting device it depends on the union nuts being screwed into the correct position on the connecting body in order to ensure pre-tensioning between the connecting body, the union nut and the pipe end that is sufficient for the tightness of the connecting device, between the end faces of the union nut and connecting body disc springs with a coloured surface are arranged. If the end faces of the union nut and connecting body are at an axial distance before assembly, this distance is bridged by the disc spring, supported between the end faces of the union nut and connecting body, which at the start of assembly is arranged obliquely between the separate end faces so that its coloured surface can be seen. With increasing screwing of the union nut onto the connecting body the disc spring is tensioned and steepens so that at the end of assembly only the outer circumferential surface of the disc spring, which is not coloured, remains visible. In this way the assembly status can be identified.

Associated with the known assembly marking in the connecting device described in EP 0 366 789 B1 is the drawback that depending on the tolerance situation or the assembly conditions in repeated dismantling and assembly of the connecting device, the disc springs used give way more quickly and can even been pressed flat without there be sufficient pre-tensioning between the components to ensure tightness. Another possibility consists in sufficient pre-tensioning already being present at a certain position of the union nut, but the disc spring not yet being pressed fully flat, so that in spite of reaching the end assembly position the disc spring in question identifies the assembly status as not being sufficient.

SUMMARY OF THE INVENTION

The invention is therefore based on the object of providing an improved assembly marking for a connecting device with features of the type in question.

The solution to this object, including advantageous embodiments and further developments of the invention is set out in the contents of the claims which follow this description.

The basic concept of the invention envisages that the indicator comprises two ring-shaped indicator bodys each bearing one marking and formed on the end faces of the connecting body and union nut, whereby at the start of assembly of the union nut the markings of the two indicator bodys are at different points on the circumference of the connecting body and union nut and when assembly of the connecting device is complete they are moved into a position corresponding with each other through the relative rotation of the two indicator bodys moved about through screwing on the union nut. The invention is associated with the advantage of more precisely showing the state of assembly, as it is based on the interaction the two indicator bodys applied to the connecting body as well as to the union nut.

In accordance with one embodiment of the invention it can be envisaged that the end surface of the indicator body on the connecting body and the union nut are designed thread-like with, on the outer end of the assigned front thread, axially aligned stop surfaces as markings, whereby before completion of the assembly there is on the one hand an axial gap between the indicator bodys and on the other hand between their stop surfaces there is a space extending in the circumferential direction and on completion of assembly, due to the axial displacement and simultaneous relative rotation of the indicator bodys with regard to each other moved about by turning of the union nut, the axial gap is closed and the two stop surfaces of the indicator bodys are in contact with each other.

Insofar as the width of the axial gap present at the start of assembly is dependent on the design of the thread for screwing the union nut onto the connecting body and the consequent axial displacement path, the two stop surfaces of two indicator bodys which are initially at a distance from one another act as markings showing the state of assembly of the connecting, insofar as they, together with the face edges of the two indicator bodys, form an open window, which closes as the union nut passes along the assembly path and is completely shut when assembly is complete.

Additionally or alternatively it can be envisaged that the markings consist of at least one optically identifiable symbol arranged on the circumferential area of the ring-shaped bodys, which on completion of assembly are moved into alignment with each other through the rotation of the ring-shaped bodys so that the state of assembly is thereby shown.

According to one embodiment of the invention, in order to identify the position of the two indicator bodys better, it is envisaged that the circumferential surface of connecting body covered by the indicator body arranged on the union nut during its rotation relative to the connecting body is trimmed with a different colour. In this way the window present between the indicator bodys at the start of assembly is visible in colour, whereas when the window is closed the colour impression disappears.

In detail, with regard to the design of the indicator bodys in accordance with a first embodiment it can be envisaged that each indicator body is formed by a separate indicator ring connected to the connecting body and the union nut respectively.

In accordance with an alternative embodiment it can suffice if one of the indicator bodys consists of a separate indicator ring connected with the connecting body or the union nut and the other indicator body is produced with a thread and a stop surface in one piece on the end surface of the connecting body or union nut.

Insofar as when using such connecting devices in practice it can happen that the connecting device is accidentally assembled too forcefully, i.e. the union nut is tightened more strongly, during initial assembly this is not critical for the tightness or reliability of the connecting. However, when using assembly identifiers confusion can occur, as through "over-assembly" the position of markings applied on one assembly identifier is changed. If in the event of initial over-assembly the union nut were to be turned back to reach the marking indicating completed assembly, the connecting would be loosened again, which must be avoided. In addition, in repeated assembly the connecting generally has to be moved into the same position as in initial assembly. However, in the case of repeat assembly following an over-assembly, in certain circumstances the assembly identifier already shows completed assembly of the connecting before reaching the over-assembly state, which results the connecting device being too loose.

In order to eliminate the effects of over-assembly during the initial assembly of the connecting device, one embodiment of the invention envisages that one indicator ring after reaching the stop through the relative movement resulting from screwing the union nut onto the connecting body is arranged in a rotatable manner between the stop surfaces of the indicator bodys after overcoming a predefined resistance.

If the two indicator bodys with the stop surface formed thereon come into contact with each other at the end of the assembly path during initial assembly, with a further turn of the union nut in the event of over-assembly the rotatably arranged indicator body is carried along and offset, whereby this indicator body stops with its markings in the position corresponding to the over-assembly. A corresponding realignment of the rotatable indicator body takes place. If the connecting device is now loosened, the indicator body offset during the over-assembly remains in the position determined by the over-assembly, and on repeated assembly the union nut has to be moved into the position reached during initial assembly before completed assembly is indicated.

Insofar as in accordance with the embodiments of the invention at least one indicator body is in the form of an indicator ring on either the connecting body or on the union nut, this indicator ring can be arranged in a turnable manner. If both indicator bodys are designed as indicator rings, one of the two indicator rings on the union nut and connecting body or also both indicator rings can be turnable.

BRIEF DESCRIPTION OF THE DRAWINGS

The drawing shows embodiments of the invention which are described below. In this

DETAILED DESCRIPTION

Figure 1:
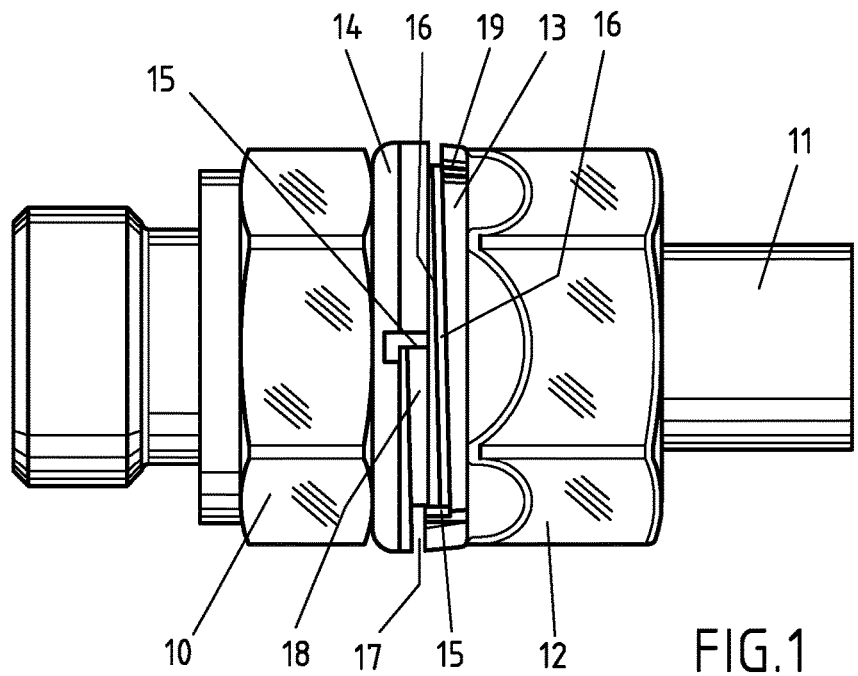
FIG. 1 shows a side view of a connecting device with a connecting body and union nut as well as an indicator ring arranged on the connecting body and on the union nut as indicating bodys before reaching the completed assembly state.

The connecting device initially seen in FIG. 1 comprises a connecting body 10 into the receptacle of which, which is not seen in further detail, a pipe-like end piece 11 is inserted and held in place by means of the union nut 12 already (partially) screwed onto the connecting body 10. The connecting between the pipe-like end piece 11 and the union nut 12 is of no relevance to the design of the invention.

To show or identify the relevant state of assembly two interacting indicator bodys 13, 14 are provided as indicators, whereby the indicator body 13 is applied to the union nut 12 and the indicator body 14 to the connecting body 10. In the illustrated embodiment both indicating bodys 13, 14 are each a separate indicator ring, as shown in more detail in FIG. 5.

Figure 5:
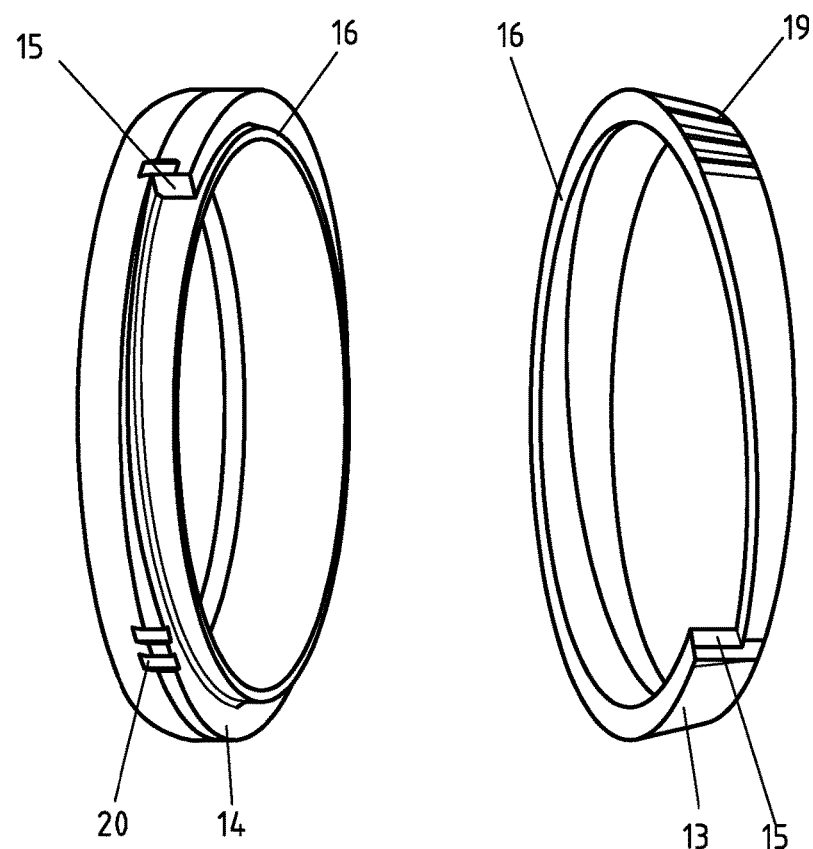
FIG. 5 shows the two indicator bodys in accordance with FIGS. 1 and 2 separately.

As can be seen from FIG. 1 in conjunction with FIG. 5, the end surface 16 of each indicator body 13, 14 is threaded, whereby arranged on the outer end of the assigned front thread is an axially aligned stop surface 15 as the end of the thread. The two indicator rings as indicating bodys 13 and 14 are positioned on the connecting body 10 and the union nut 12 respectively in such a way that in the last part of the screw path of the union nut 12 before reaching the completed assembly state there is an axial gap 17 between the end surfaces 16 of the indicator bodys 13, 14, and the two stop surfaces 15 of the indicator body 13 and the indicator body 14 maintain a gap extending in the circumferential direction so that together with the sections of the end surfaces 16 located in the area of the circumferential gap a window 18 is produced, whereby this window 18 and/or the stop surfaces 15 can be considered as markings arranged on the indicator bodys 13, 14 to show the state of assembly. If the circumferential surface of the connecting body 10 covered by the indicator body 13 arranged on the union nut 12 during its movement relative to the connecting body 10 is coloured, the base of the window 18 appears coloured accordingly so that the still open window 18 shown in FIG. 1 in the assembly position before reaching the completed assembly state appears with a coloured base and can therefore be easily seen.

Figure 2:
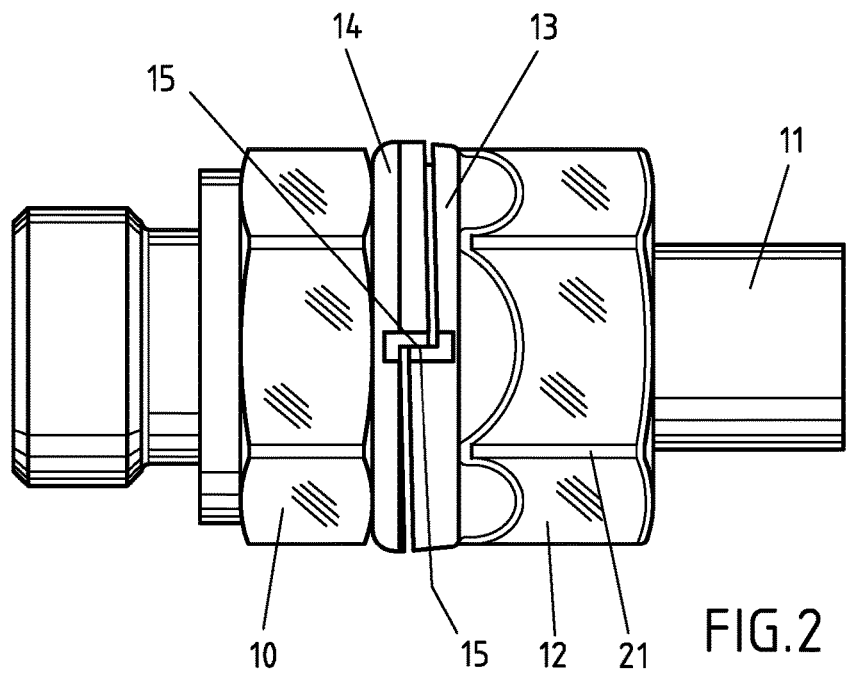
FIG. 2 shows the connecting device in accordance with FIG. 1 in the completed assembly state.

To the extent that completed assembly position of the connecting device in accordance with FIG. 1 is evident from FIG. 2, it can be seen that through turning the union nut into the drawing plane the stop surface 15 of the indicator body on the union nut 13 has turned and is now in contact with the stop surface 15 of the indicator body 14 on the connecting body 10, so that the window 18 in figure is closed. At the time the axial gap between the indicator bodys 13, 14 is closed so that the completed assembly position can be seen from this.

Figure 3:
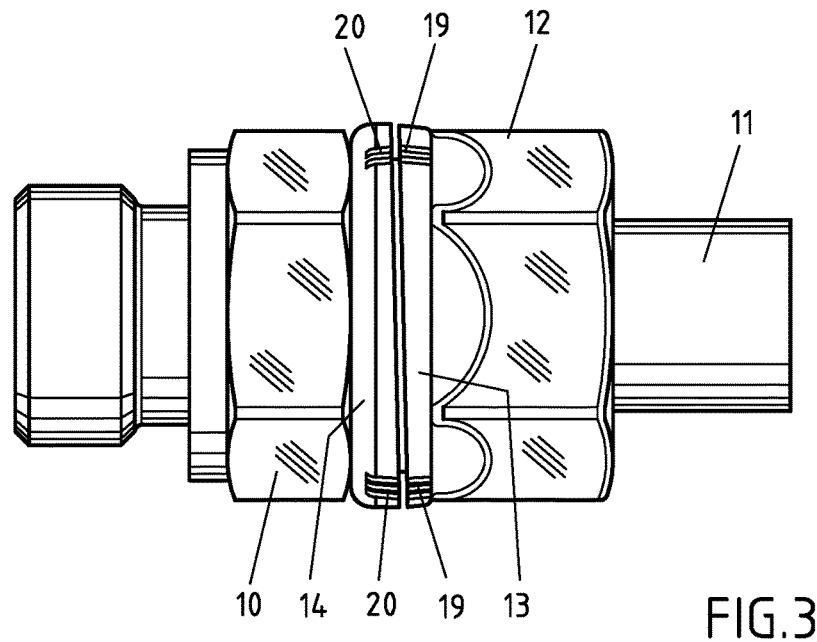
FIG. 3 shows a rear view rotated about 180° the subject matter of FIG. 2.

In the illustrated embodiment optically visible markings 19 and 20 are applied to the circumferential indicator bodys 13 and 14 respectively, which before reaching the completed assembly position are located at different positions and on reaching the completed assembly position are moved into alignment with each other as can be seen from FIG. 3.

Insofar as in a special embodiment of the invention measures are taken so that the position of the union nut 12 on the connecting body 10 moved about in the event of over-assembly during initial or repeated assembly can again be attained in subsequent repeated assemblies, in the embodiment shown in the drawing it is envisaged that the indicator body 13 on the union nut 12 is arranged in turnable manner on the union nut 12 in such a way that the indicator body 13 can be turned with regard to the union nut 12 on overcoming a predefined resistance.

Figure 4:
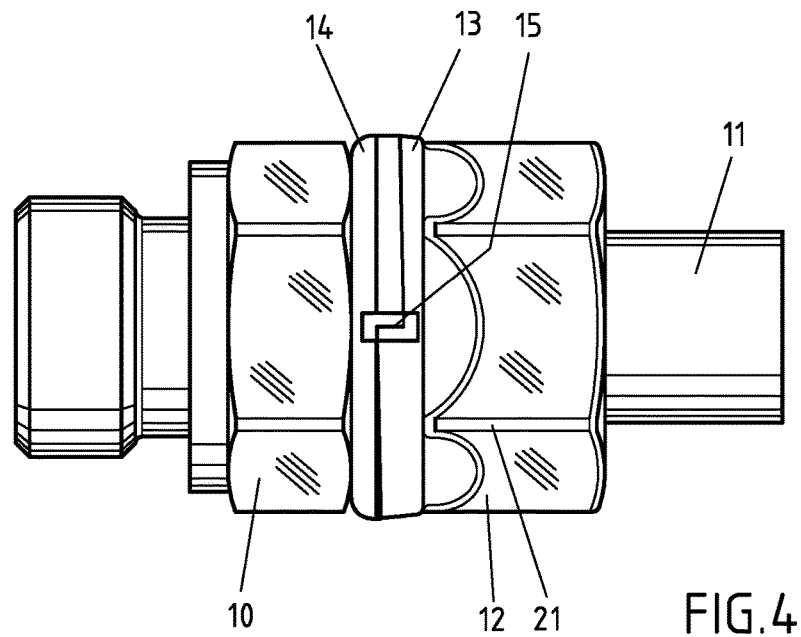
FIG. 4 shows the connecting device in accordance with FIG. 2 following over-assembly.

Insofar as such an over-assembly position is shown in FIG. 4 the position can be seen by comparing FIG. 4 with FIG. 2. It can be seen that the stop surface 15 of the indicator body 14 on the connecting body 10 is in the same position in FIG. 2 and in FIG. 4. If in the assembly position shown in FIG. 2 the union nut 12 has completed an over-assembly turn into the drawing plane, the lowest rib 21 on the screw contour of the union nut 12 as shown in FIG. 2, in the over-assembly position shown in FIG. 4 has moved upwards and thus closer to the stop surface 15 of the indicator body 13. As the indicator body on the union nut 12 was immobilised with its stop surface 15 by the stop surface 15 of the indicator body 14 on the connecting body 10 on reaching the completed assembly state (FIG. 2), the further turning of the union nut 12 associated with the over-assembly has led to a relative off-setting between the indicator body 13 and the union nut 12. If the connecting shown in FIG. 4 is loosened the indicator body 13 remains in the offset position on the union nut 12 and on repeated assembly of the connecting the union nut 12 now has to be turned to the position shown in FIG. 4 in order to achieve a correct completed assembly position.

The features of the subject matter disclosed in the above description, the claims, the abstract and the drawing can be essential on their own or in any combination with each other for implementing the invention in its various embodiments.

The invention claimed is:

1. A connecting device for pipes or hoses, the connecting device comprising
   a connecting body having a borehole for the passage of a medium flowing through the pipe or hose, and
   a tubular end piece of the pipe of hose that can be inserted into a receptacle provided at a front end of the connecting body and that can be fixed therein by means of a union nut,
   wherein the union nut is arranged rotatably between a loosened position and an assembly position on an outside of the connecting body,
   wherein an indicator is arranged between opposing end faces of the union nut and the connecting body, the indicator showing a state of assembly of the connecting device,
   wherein the indicator comprises two ring-shaped indicator bodies each bearing one marking and being formed on said end faces of the connecting body and union nut,
   wherein at a start of assembly of the union nut the markings of the two indicator bodies are at different points on a circumference of the connecting body and the union nut, and when assembly of the connecting device is complete the markings are moved into a position corresponding with each other through the relative rotation of the two indicator bodies moved about through screwing on the union nut,
   wherein each indicator body is formed by a separate indicator ring connected with the connecting body and the union nut respectively, and
   wherein one indicator ring, after reaching a stop between stop surfaces of the indicator rings through the relative movement resulting from screwing the union nut onto the connecting body and after overcoming a predefined resistance, is arranged in a rotatable manner.

2. The connecting device according to claim 1, wherein end faces of the indicator bodies on the connecting body and the union nut are threaded and have an axially aligned stop surface as a marking on an outer end of a respective foremost thread, wherein before completion of assembly there is an axial gap between the indicator bodies and between their stop surfaces there is a gap extending in the circumferential direction, and wherein on completion of assembly due to the axial displacement occurring during turning of the union nut and the simultaneous relative rotation of the indicator bodies with respect to each other, the axial gap is closed and the stop surfaces on both of the indicator bodies are in contact with one another.

3. The connecting device according to claim 1, wherein the markings consist of at least one optically identifiable symbol arranged on at least one circumferential area of the indicator body, and wherein in the completed assembly position the markings are moved into alignment with each other through the rotation of the indicator bodies with respect to each other.

4. The connecting device according to claim 1, wherein a circumferential surface of the connecting body covered by the indicator body arranged on the union nut during its rotation relative to the connecting body is trimmed with a different colour.

5. A connecting device for pipes or hoses, the connecting device comprising
   a connecting body having a borehole for the passage of a medium flowing through the pipe or hose, and
   a tubular end piece of the pipe or hose that can be inserted into a receptacle provided at a front end of the connecting body and that can be fixed therein by means of a union nut,
   wherein the union nut is arranged rotatably between a loosened position and an assembly position on an outside of the connecting body,
   wherein an indicator is arranged between opposing end faces of the union nut and the connecting body, the indicator showing a state of assembly of the connecting device,
   wherein the indicator comprises two ring-shaped indicator bodies each bearing one marking and being formed on said end faces of the connecting body and union nut,
   wherein at a start of assembly of the union nut the markings of the two indicator bodies are at different points on a circumference of the connecting body and the union nut, and when assembly of the connecting device is complete the markings are moved into a position corresponding with each other through the relative rotation of the two indicator bodies moved about through screwing on the union nut,
   wherein one of the indicator bodies is a separate indicator ring connected with the connecting body or the union nut and the other indicator body is provided with a thread and a stop surface in one piece on the end surface of the connecting body or union nut, and
   wherein the one indicator ring, after reaching a stop between stop surfaces of the indicator bodies through the relative movement resulting from screwing the union nut onto the connecting body and after overcoming a predefined resistance, is arranged in a rotatable manner.

* * * * *